US011041651B2

(12) United States Patent　　(10) Patent No.: US 11,041,651 B2
　　ElSaadany　　　　　　　　　　　　(45) Date of Patent: Jun. 22, 2021

(54) ENERGY RECOVERY SYSTEM FOR HVAC SYSTEM

(71) Applicant: Johnson Controls Technology Company, Auburn Hills, MI (US)

(72) Inventor: Mahmoud S. E. ElSaadany, New Cairo (EG)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/446,366

(22) Filed: Jun. 19, 2019

(65) Prior Publication Data

US 2020/0370775 A1　Nov. 26, 2020

Related U.S. Application Data

(60) Provisional application No. 62/852,879, filed on May 24, 2019.

(51) Int. Cl.
　　*F03B 13/00*　　(2006.01)
　　*H02P 9/04*　　(2006.01)
　　(Continued)

(52) U.S. Cl.
　　CPC ............... *F24F 11/46* (2018.01); *F03D 9/25* (2016.05); *F24F 13/06* (2013.01);
　　(Continued)

(58) Field of Classification Search
　　CPC ............ F04B 2220/60; F04B 2220/602; F04B 2220/604; Y02B 10/30
　　See application file for complete search history.

(56) References Cited

U.S. PATENT DOCUMENTS 4,159,426 A * 6/1979 Staton ..................... H02K 53/00
　　　　　　　　　　　　　　　　290/44
5,734,202 A * 3/1998 Shuler ..................... F03D 9/255
　　　　　　　　　　　　　　　　290/55
(Continued)

FOREIGN PATENT DOCUMENTS

WO　　WO-2012149347 A2 * 11/2012 ............... F03D 9/00

OTHER PUBLICATIONS

W.T. Chong et al, "Design of an exhaust air energy recovery wind turbine generator for energy conservation in commmercial buildings," Renewable Energy, 2013, Malaysia.
(Continued)

*Primary Examiner* — Tulsidas C Patel
*Assistant Examiner* — Thomas K Quigley
(74) *Attorney, Agent, or Firm* — Fletcher Yoder, P.C.

(57) ABSTRACT

Embodiments of the present disclosure are directed to an energy recovery system for a heating, ventilation, and/or air conditioning (HVAC) system. The energy recovery system includes a nozzle having a flow passage with an inlet passage and an outlet passage that is narrowed relative to the inlet passage, in which the nozzle is configured to couple to a condenser and receive an air flow into the flow passage from a condenser fan. The energy recovery system further includes a wind turbine disposed within the outlet passage of the flow passage and having a first axis of rotation, and a generator that is external to the nozzle and that includes a shaft with a second axis of rotation. The generator is coupled to the wind turbine, such that the first axis of rotation is aligned with the second axis of rotation.

25 Claims, 8 Drawing Sheets

(51) Int. Cl.
*F24F 11/46* (2018.01)
*F24F 13/06* (2006.01)
*F03D 9/25* (2016.01)
*F24F 140/10* (2018.01)
*F24F 110/10* (2018.01)
*F24F 110/20* (2018.01)
*F24F 12/00* (2006.01)

(52) U.S. Cl.
CPC ... *F05B 2220/602* (2013.01); *F05B 2220/604* (2013.01); *F24F 12/002* (2013.01); *F24F 2110/10* (2018.01); *F24F 2110/20* (2018.01); *F24F 2140/10* (2018.01)

(56) References Cited

U.S. PATENT DOCUMENTS

| | | | | |
|---|---|---|---|---|
| 6,365,985 | B1* | 4/2002 | Cohen | F03D 9/00 290/55 |
| 7,018,166 | B2 | 3/2006 | Gaskell | |
| 7,112,893 | B1* | 9/2006 | Villanueva | F01K 23/068 290/55 |
| 7,208,846 | B2* | 4/2007 | Liang | F03D 9/00 290/1 R |
| 7,999,407 | B2* | 8/2011 | Saluccio | F03D 9/00 290/54 |
| 8,013,465 | B2 | 9/2011 | Gilbert | |
| 8,183,709 | B1* | 5/2012 | Manning | F03D 9/25 290/55 |
| 8,466,572 | B2* | 6/2013 | Zazi | F03D 9/25 290/44 |
| 8,759,997 | B2* | 6/2014 | Gilbert | H02K 7/1876 290/55 |
| 8,884,453 | B2* | 11/2014 | Barzilai | F03D 80/00 290/50 |
| 8,941,256 | B1* | 1/2015 | Czamara | F03D 9/10 290/55 |
| 8,952,557 | B2* | 2/2015 | Farrell | F03D 9/255 290/44 |
| 8,963,359 | B2* | 2/2015 | Evans | F01D 13/02 290/54 |
| 9,260,975 | B2 | 2/2016 | Schuler | |
| 9,366,152 | B2* | 6/2016 | Evans | F03D 9/25 |
| 10,060,647 | B2 | 8/2018 | McMahon | |
| 10,060,667 | B2* | 8/2018 | Martens | F25D 17/06 |
| 10,222,083 | B2* | 3/2019 | Drees | H02J 3/32 |
| 10,291,423 | B2* | 5/2019 | Ritmanich | H04L 43/065 |
| 10,324,483 | B2* | 6/2019 | ElBsat | G05F 1/575 |
| 2007/0252391 | A1* | 11/2007 | Chen | F03D 9/25 290/55 |
| 2008/0188174 | A1* | 8/2008 | Aminpour | F03D 1/04 454/309 |
| 2009/0146425 | A1* | 6/2009 | Widisky | F24F 12/00 290/44 |
| 2009/0206611 | A1* | 8/2009 | Gilbert | F03D 1/025 290/55 |
| 2010/0117370 | A1* | 5/2010 | Phelps | F03D 9/255 290/55 |
| 2010/0244455 | A1* | 9/2010 | Berginc | F03D 9/11 290/55 |
| 2011/0049893 | A1* | 3/2011 | Saluccio | F24F 12/00 290/52 |
| 2012/0038162 | A1* | 2/2012 | Smith, Jr. | H02K 21/24 290/52 |
| 2012/0091710 | A1* | 4/2012 | Evans | F03D 9/25 290/43 |
| 2012/0280503 | A1* | 11/2012 | Mahawili | F24F 1/50 290/52 |
| 2016/0377306 | A1* | 12/2016 | Drees | H02J 13/00028 700/295 |
| 2017/0102162 | A1* | 4/2017 | Drees | H02J 15/00 |
| 2017/0103483 | A1* | 4/2017 | Drees | G05B 13/021 |
| 2017/0108238 | A1* | 4/2017 | McMahon | H02K 7/1823 |
| 2017/0317915 | A1* | 11/2017 | Ritmanich | H04L 43/065 |
| 2017/0342990 | A1* | 11/2017 | Martens | F03D 9/25 |
| 2017/0343268 | A1* | 11/2017 | Martens | F03D 9/34 |
| 2018/0196456 | A1* | 7/2018 | ElBsat | H02J 7/0068 |
| 2020/0026249 | A1* | 1/2020 | Przybylski | F24F 11/49 |
| 2020/0218233 | A1* | 7/2020 | ElBsat | G05F 1/66 |

OTHER PUBLICATIONS

Ahmad Fazlizan et al, "Design and Experimental Analysis of an Exhaust Air Energy Recovery Wind Turbine Generator," Energies, 2015, 8, 6566-6584, ISSN 1996-1073, licensee MDPI, Basel, Switzerland.

S.P. Venkatesan et al, "Increasing Efficiency of a Wind Turbine Using a Convergent Nozzle in Combination with a Flanged Diffuser," International Journal of Applied Engineering Research, 2015, vol. 10, No. 11, ISSN 0973-4562, Research India Publications.

Robert Thresher et al, "Wind Energy Technology: Current Status and R&D Future," National Renewable Energy Laboratory, 2008, Conference Paper NREL/CP-500-43374, Physics of Sustainable Energy Conference, University of California at Berkeley.

Peter J. Schubel et al, "Wind Turbine Blade Design," Energies, 2012, 5, 3425-3449, ISSN 1996-1073, licensee MDPI, Basel, Switzerland.

C. E. A. Silva et al., "A novel three-phase rectifier with high power factor for wind energy conversion systems," Brazilian Power Electronics Conference, 2009, ISSN 2175-8603, Brazil.

N. S. çetin et al., "Assessment of optimum tip speed ratio of wind turbines," Mathematical and Computational Applications, 2005, pp. 147-154, vol. 10, No. 1, Association for Scientific Research.

NACA 4415 (naca4415-il), Standard airfoil data sheet, 2019, http://airfoiltools.com/airfoil/details?airfoil=naca4415-il.

M. Ragheb, "Optimal Rotor Tip Speed Ratio," 2014, https://mragheb.com/NPRE%20475%20Wind%20Power%20Systems/Optimal%20Rotor%20Tip%20Speed%20Ratio.pdf.

A. Lebsir et al, "Electric Generators Fitted to Wind Turbine Systems: An Up-to-Date Comparative Study," Journal of Electrical Systems, 2015, pp. 281-295, ESR Groups, 11 (3), hal-01213120.

"ERX—Energy Recovery Application with the WT6500 Wind Turbine," Energy Recovery application by WindTronics, 2011-2019 Solar Windependence, http://www.solarwindependence.com/EnergyRecovery-s23.htm.

* cited by examiner

US 11,041,651 B2

ENERGY RECOVERY SYSTEM FOR HVAC SYSTEM

CROSS REFERENCE TO RELATED APPLICATIONS

This application claims priority from and the benefit of U.S. Provisional Application Ser. No. 62/852,879, entitled "ENERGY RECOVERY SYSTEM FOR HVAC SYSTEM," filed May 24, 2019, which is hereby incorporated by reference in its entirety for all purposes.

BACKGROUND

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of an air flow delivered to the environment. For example, the HVAC system may place the air flow in a heat exchange relationship with a refrigerant to condition the air flow. During operation of the HVAC system, certain components of the HVAC system may be constantly supplied with power to operate and to enable the HVAC system to condition the air flow. As a result, operating the HVAC system may continuously consume energy.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an energy recovery system for a heating, ventilation, and/or air conditioning (HVAC) system having a nozzle that includes a flow passage with an inlet passage and an outlet passage that is narrowed relative to the inlet passage, in which the nozzle is configured to couple to a condenser and receive an air flow into the flow passage from a condenser fan. The energy recovery system further includes a wind turbine disposed within the outlet passage of the flow passage and having a first axis of rotation, and a generator that is external to the nozzle and that includes a shaft with a second axis of rotation. The generator is coupled to the wind turbine, such that the first axis of rotation is aligned with the second axis of rotation.

In another embodiment, an energy recovery system for a heating, ventilation, and/or air conditioning (HVAC) system includes a conduit configured to receive an air flow and having a narrowed outlet passage. The energy recovery system additionally includes a generator positioned external to the narrowed outlet passage, and a wind turbine having a rotational axis, coupled to the generator, and disposed in the narrowed outlet passage, in which rotation of the wind turbine about the rotational axis causes the generator to produce electrical power. The energy recovery further includes a support frame coupled to the generator and to the conduit, such that the conduit, the generator, and the wind turbine are aligned about the rotational axis of the wind turbine.

In another embodiment, a heating, ventilation, and/or air conditioning (HVAC) system includes a condenser having a fan deck and a condenser fan, in which the fan deck has an opening, and the condenser fan is configured to direct an air flow through the opening. The HVAC system further includes an energy recovery system having a conduit positioned from the fan deck by an offset distance and configured to receive the air flow directed through the opening, a support frame coupled to a generator and to the conduit, and a wind turbine having a rotational axis, coupled to the generator, and disposed within a narrowed outlet passage of the conduit. The conduit, the generator, and the wind turbine are aligned about the rotational axis of the wind turbine.

DRAWINGS

Various aspects of this disclosure may be better understood upon reading the following detailed description and upon reference to the drawings in which.

DETAILED DESCRIPTION

Figure 1:
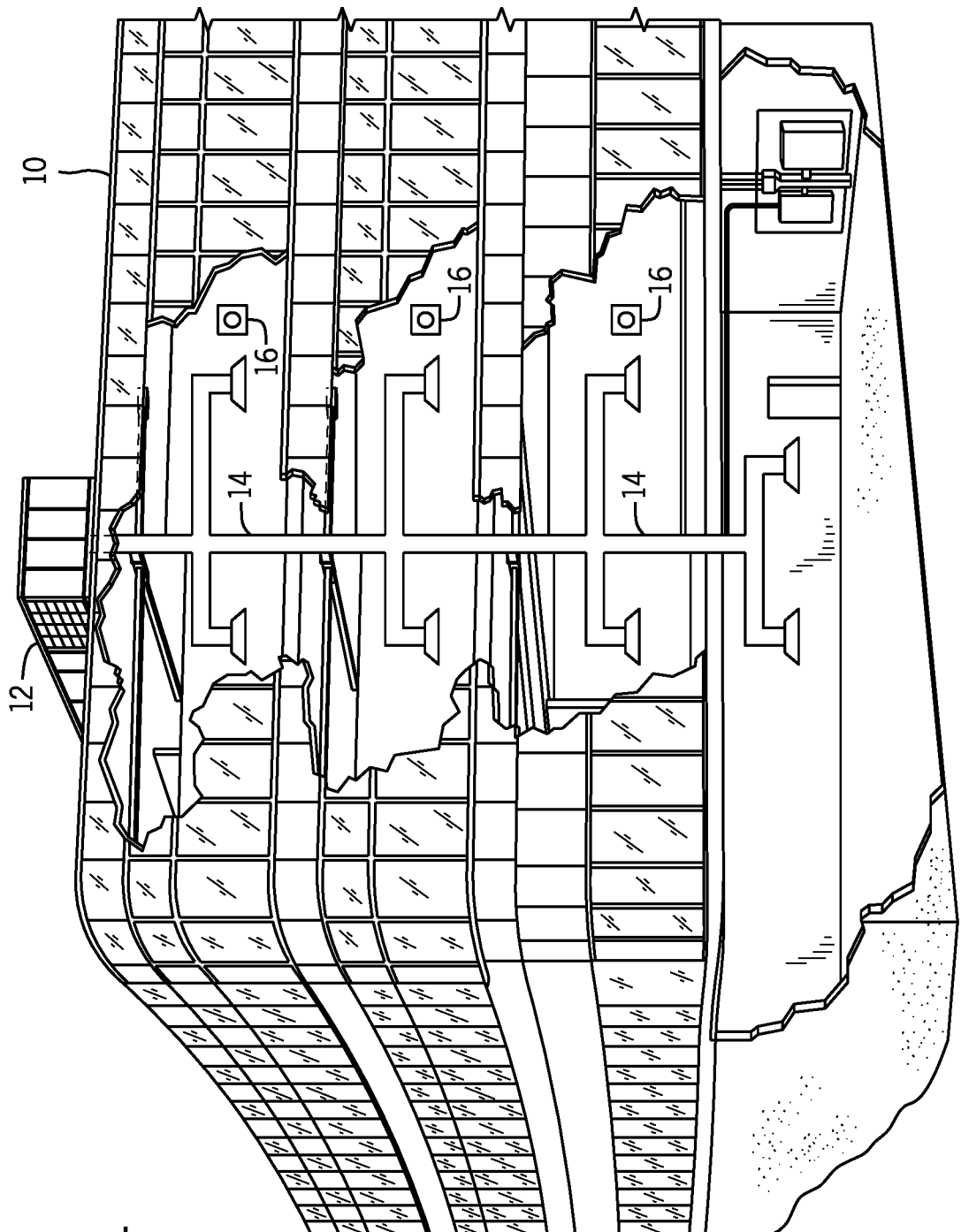
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may condition a return air flow by placing the return air flow in a heat exchanger relationship with a refrigerant directed through the HVAC system. The HVAC system may then deliver the conditioned return air flow to a building as a supply air flow to condition the building. Operating the HVAC system consumes energy and incurs costs. For example, a component of the HVAC system may constantly receive a supply of energy, such as electrical power, during operation of the HVAC system. As a result, it is desirable to reduce costs associated with operating the HVAC system.

Thus, it is presently recognized that recovering some of the energy expended by the HVAC system may reduce the cost of operating the HVAC system. Accordingly, embodiments of the present disclosure are directed to an energy recovery system configured to generate power during operation of the HVAC system. In some embodiments, the energy recovery system may be fluidly coupled to a fan of the HVAC system, such as a condenser fan. The energy recovery system may include a wind turbine coupled to a generator. During operation of the HVAC system, the fan may rotate and direct an ambient air flow that drives the wind turbine to rotate. Rotation of the wind turbine may then cause the generator to generate electrical power. The generated electrical power may then be used to reduce the costs associated with operating the HVAC system, such as by returning the electrical power to a utility power grid for a cost compensation and/or by utilizing the generated electrical power to operate the HVAC system, thereby reducing power utilized from an external source.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
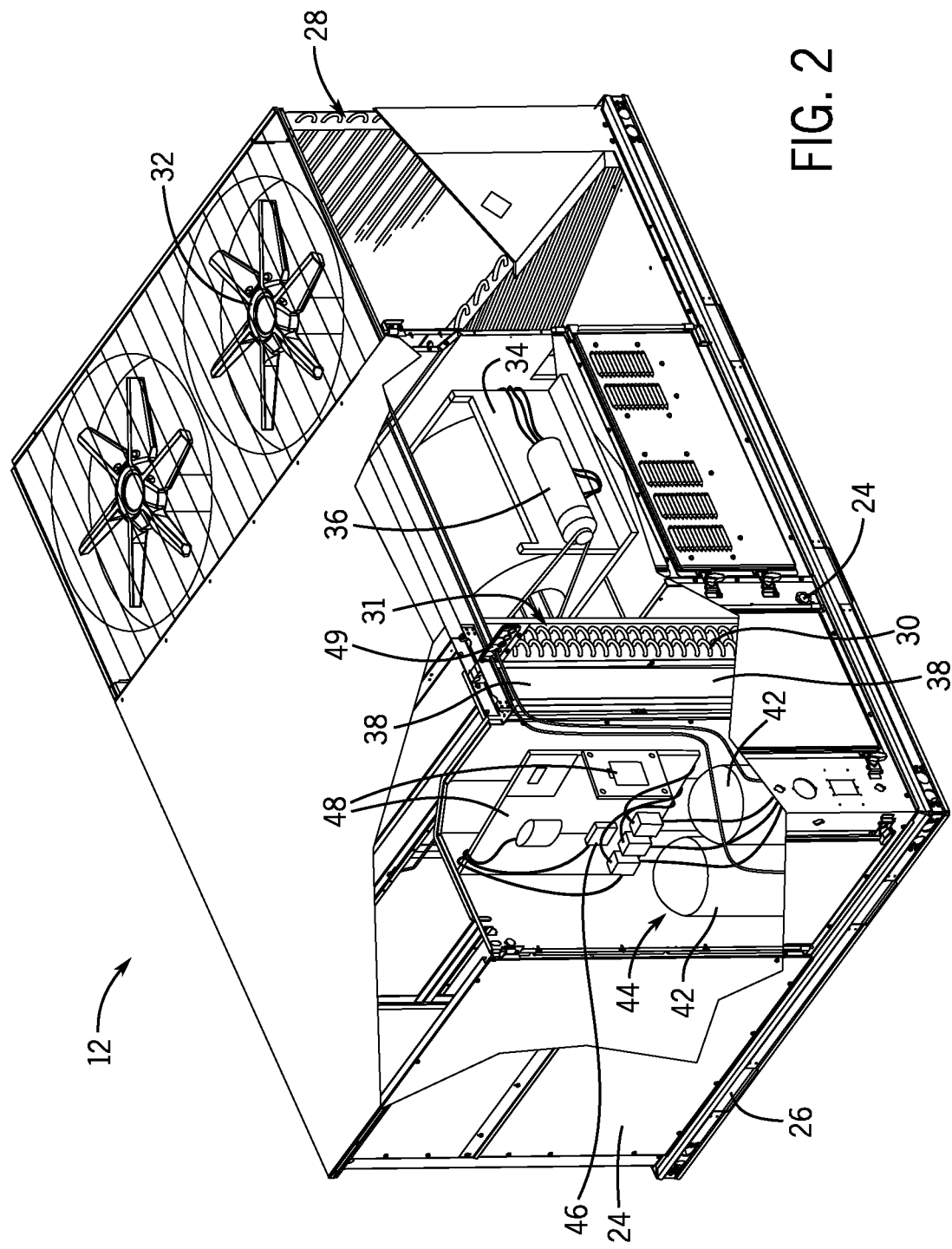
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single packaged unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
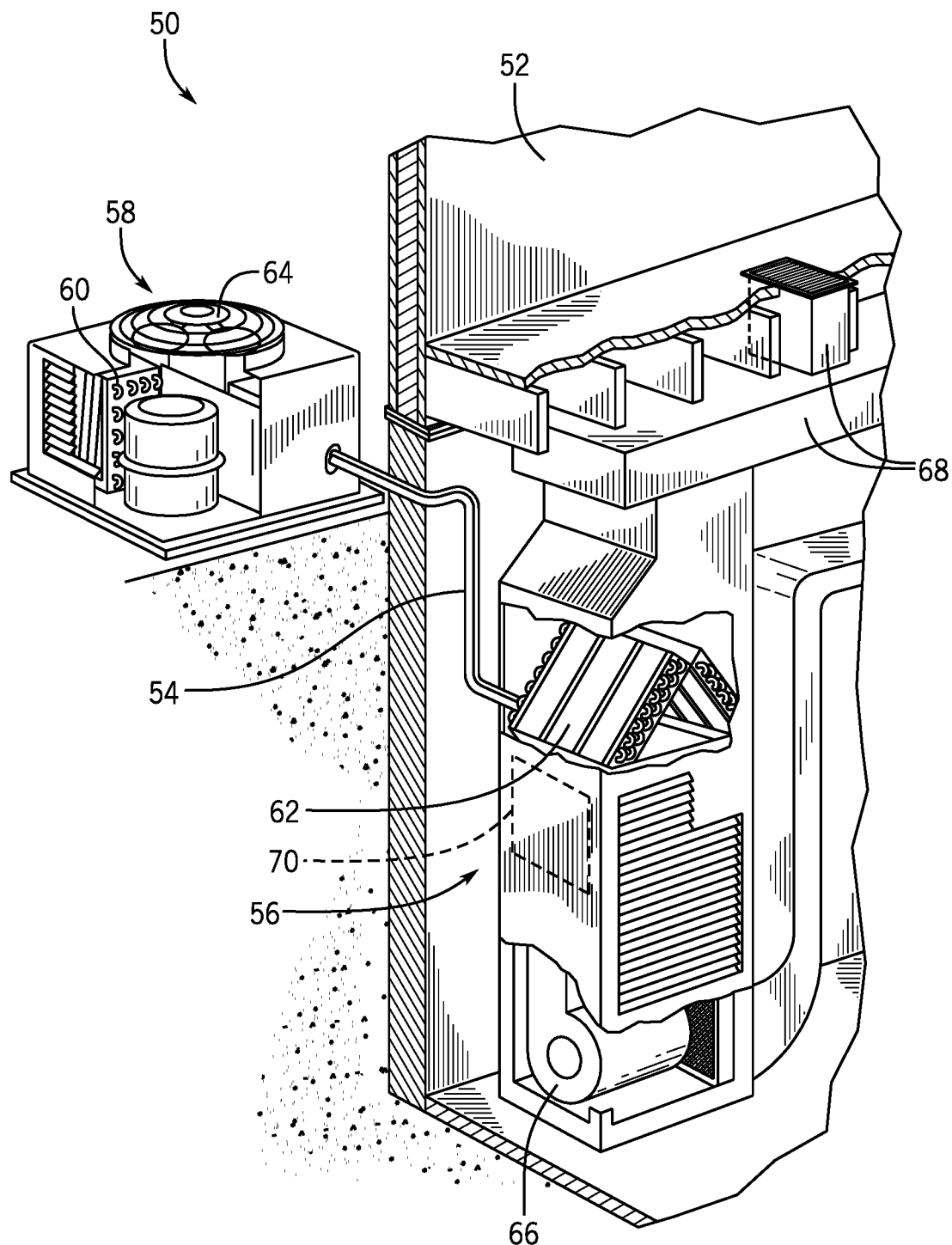
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
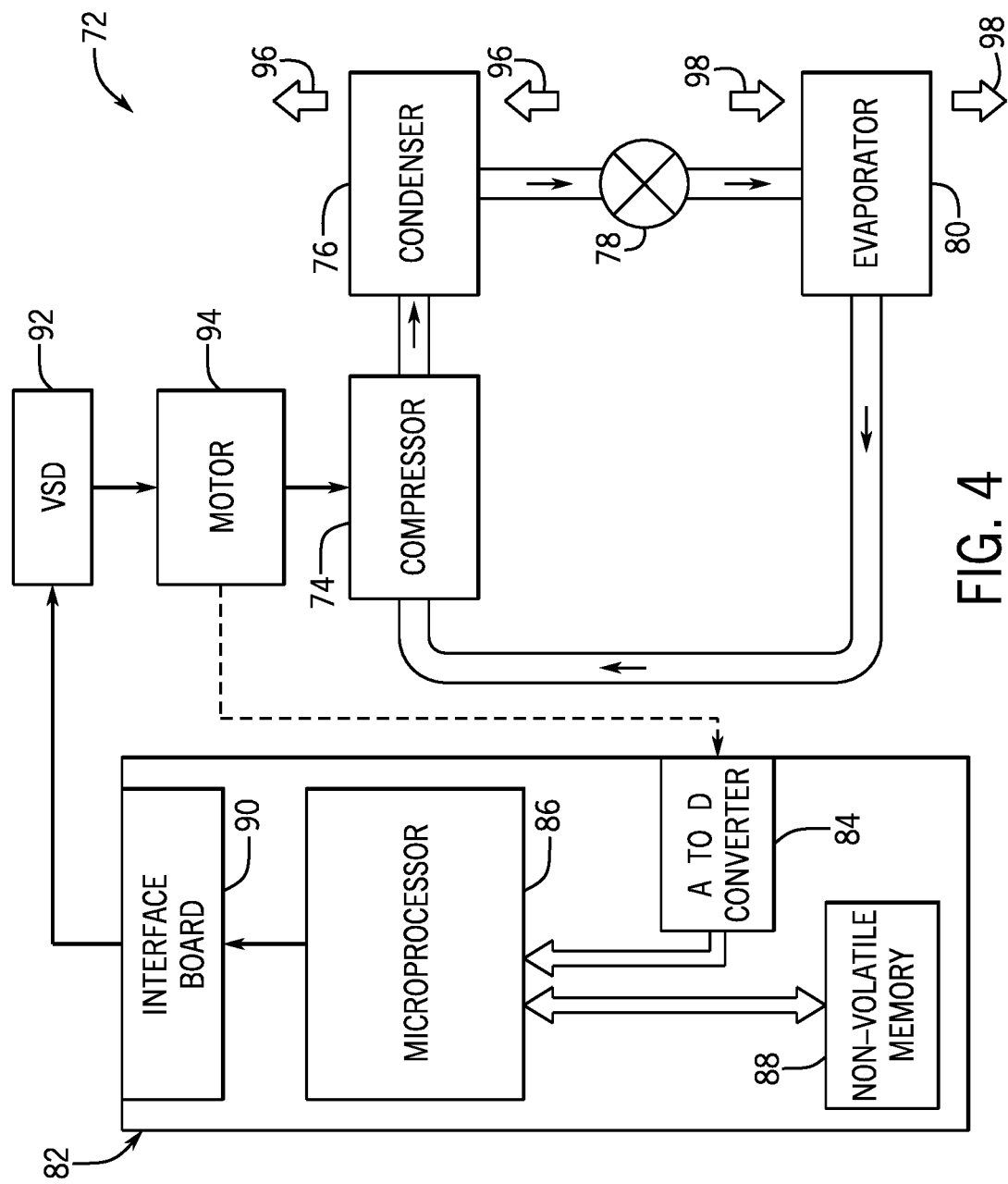
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be noted that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system having an energy recovery system configured to generate electrical power during operation of the HVAC system. The energy recovery system may be fluidly coupled to a condenser fan of the HVAC system. During operation of the HVAC system, a fan of a condenser may be rotated to direct an ambient air flow across the condenser in order to cool a refrigerant directed through the condenser. Rotation of the fan may also force the ambient air flow through the energy recovery system to rotate a wind turbine of the energy recovery system. Rotation of the wind turbine may then cause a generator of the energy recovery system to generate electrical power. The HVAC system may then use the generated electrical power to reduce the cost of operating the HVAC system. In some embodiments, the energy recovery system may include a conduit through which the ambient air flow is directed. The conduit may increase the flow rate of the ambient air flow, thereby increasing a rotational speed of the wind turbine to increase an amount of energy generated by the generator. Additionally or alternatively, the conduit may reduce or limit a static pressure or a resistance that would otherwise limit a rotational speed of the fan of the condenser. In this manner, the fan of the condenser may rotate more easily and may effectively direct the ambient air flow across the condenser without utilizing additional power or energy. Although this disclosure primarily discusses implementation of the energy recovery system with a condenser, in additional or alternative embodiments, the energy recovery system may be implemented to other suitable components, such as an exhaust vent, of the HVAC system.

Figure 5:
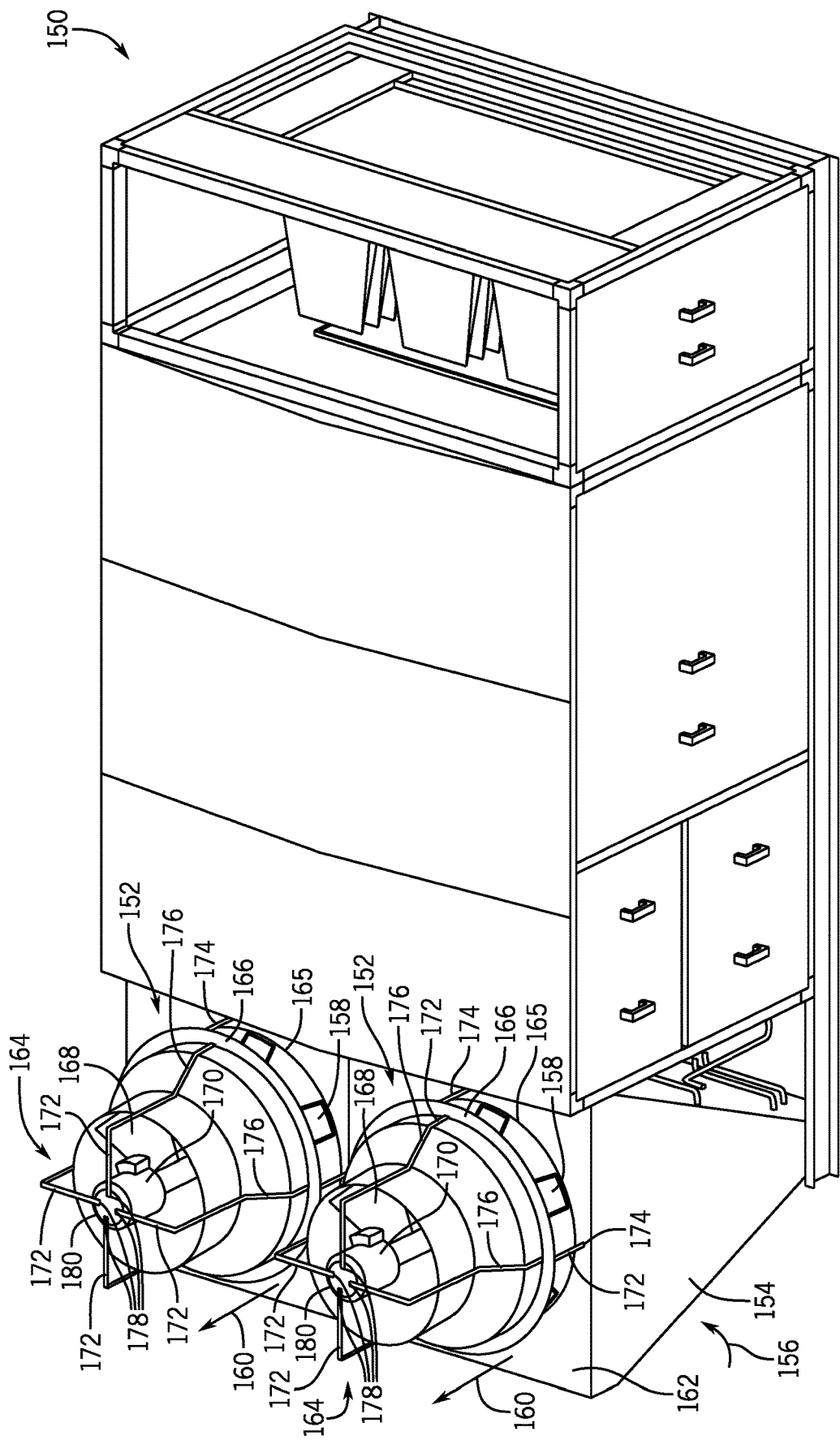
FIG. 5 is a perspective view of an embodiment of an HVAC system having an energy recovery system coupled to a condenser of the HVAC system, in accordance with an aspect of the present disclosure.

FIG. 5 is a perspective view of an embodiment of an HVAC system 150 having an energy recovery system 152 coupled to a condenser 154 of the HVAC system 150. The HVAC system 150 is a packaged unit, such a rooftop unit, in the illustrated embodiment. In additional or alternative embodiments, the HVAC system 150 may be another type of HVAC system, such as a split system. The condenser 154 may cool a refrigerant flowing through the HVAC system 150 by directing an air flow across the condenser 154, thereby transferring heat between the refrigerant and the air flow. For example, the condenser 154 may include condenser fans 158 that each draws an air flow from an ambient environment into the condenser 154 in an intake direction 156. In the condenser 154, the air flow may absorb heat from the refrigerant to cool the refrigerant and heat the air flow. The condenser fans 158 may then direct the air flow out of the condenser 154 in an output direction 160. In some embodiments, each condenser fan 158 may be a constant speed fan configured to operate at substantially the same rotational speed during operation of the HVAC system 150. Additionally or alternatively, each condenser fan 158 may be a variable speed fan configured to operate at various rotational speeds during operation of the HVAC system 150.

The energy recovery system 152 may be coupled to the condenser 154, such as to a fan deck 162, via a support frame 164 to enable the energy recovery system 152 to receive the air flow discharged directly out of the condenser 154. In additional or alternative embodiments, the energy recovery system 152 may be coupled to the condenser 154 such that air flow discharged from the condenser 154 does not flow directly to the energy recovery system 152. For example, the energy recovery system 152 may be positioned to enable the condenser 154 to discharge the air flow through another component of the HVAC system 150 before the air flow is directed to the energy recovery system 152. In further embodiments, the energy recovery system 152 may be movable and its position may be adjusted to selectively enable the air flow discharged from the condenser 154 to flow through the energy recovery system 152. Indeed, the energy recovery system 152 may be manually and/or automatically moved between enabling the air flow discharged from the condenser 154 to flow through the energy recovery system 152 and blocking or restricting the air flow discharged from the condenser 154 to flow through the energy recovery system 152. That is, in the first position, the energy recovery system 152 may be in use during operation of the HVAC system 150 and, in the second position, the energy recovery system 152 may not be in use during operation of the HVAC system 150. The illustrated fan deck 162 includes two condenser fans 158 and separate energy recovery systems 152 that are configured to receive the respective air flows directed by the condenser fans 158, such as through respective openings 165 of the fan deck 162. In additional or alternative embodiments, a single energy recovery system 152 may be configured to receive both of the air flows directed by the condenser fans 158. In further embodiments, the condenser 154 may include any number of condenser fans 158, and any suitable number of energy recovery systems 152 may be coupled to the condenser 154 to receive the air flows directed by the condenser fans 158.

The energy recovery system 152 may include a conduit 166 coupled to the support frame 164 and positioned over the opening 165 to receive the air flow forced by the condenser fan 158 out of the condenser 154. The energy recovery system 152 may further include a wind turbine 168 disposed within the conduit 166 and a generator 170 coupled to the wind turbine 168. As used herein, a "wind turbine" may be in suitable device, such as a turbine fan, blades, an airfoil propeller fan, or other feature, configured to convert kinetic energy of an air flow into rotational energy that is transferred to a shaft. The wind turbine 168 may be manufactured and/or purchased separately from the conduit 166 and from the generator 170. For example, the conduit 166 may be manufactured to have certain specifications or dimensions based on the implementation of the energy recovery system 152. Additionally, other components of the energy recovery system 152, such as the wind turbine 168, may be specifically designed based on the specification of the HVAC system 150, thereby enabling the energy recovery system 152 to generate a desirable amount of energy during operation of the HVAC system 150.

In the illustrated embodiment, the support frame 164 includes separate segments 172 that may each extend away from the fan deck 162. Each segment 172 may couple to the fan deck 162 at a first end 174 of the segment 172, may couple to the conduit 166 at an intermediate section 176 of the segment 172, and may couple to the generator 170 at a second end 178 of the segment 172. For instance, the second end 178 of each segment 172 may couple to a surface 180 of the generator 170. The generator 170 may then extend from the second end 178 of the segment 172 toward the fan deck 162 to position the wind turbine 168 within the conduit 166. In this way, the support frame 164 supports the conduit 166, the wind turbine 168, and the generator 170.

Figure 6:
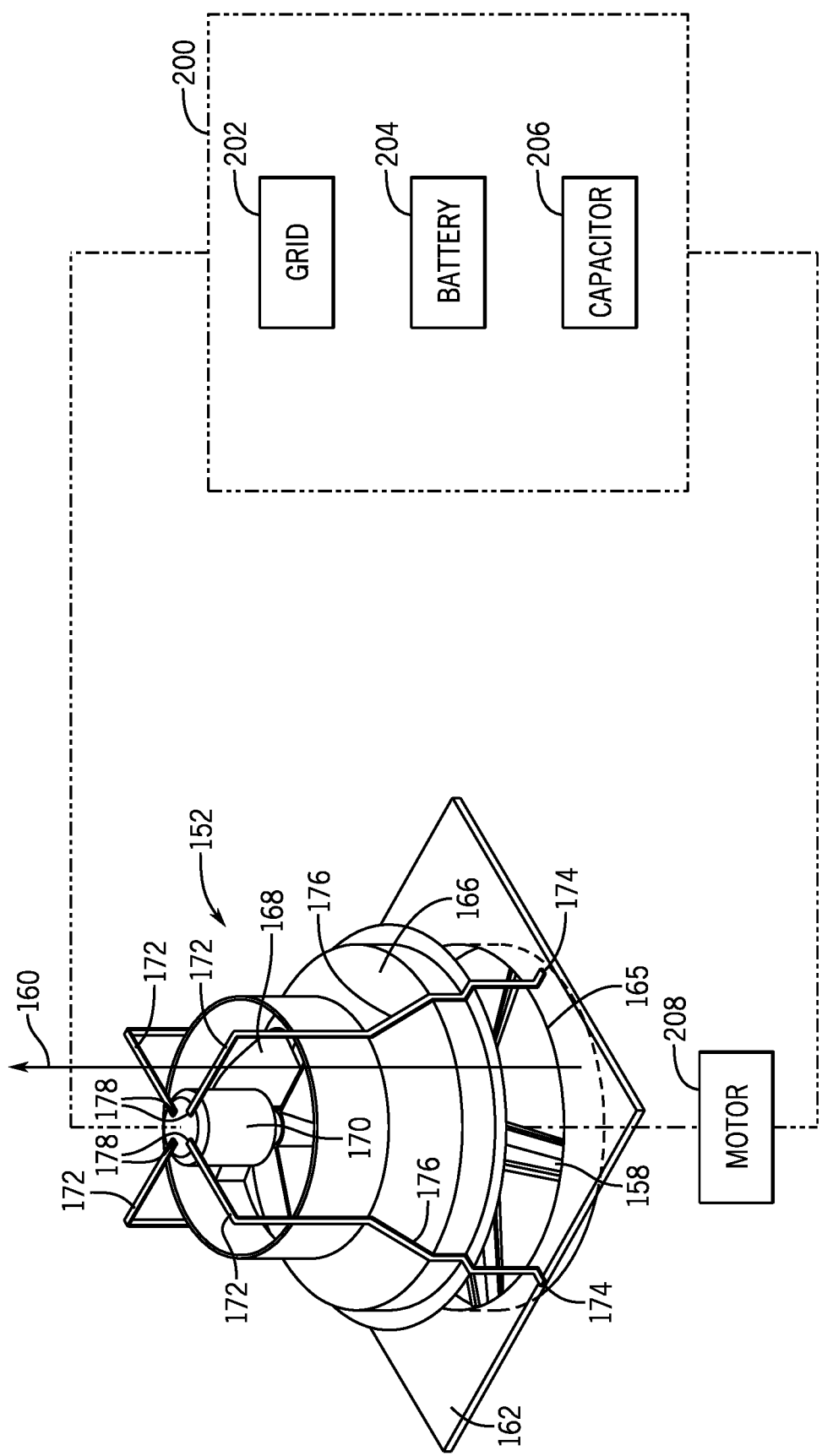
FIG. 6 is a schematic view of an embodiment of an energy recovery system coupled to a fan deck and electrically coupled to a power source, in accordance with an aspect of the present disclosure.

FIG. 6 is a schematic view of the energy recovery system 152 coupled to the fan deck 162 and electrically coupled to a power source 200. The power source 200 may include a utility power grid 202, a battery 204, a capacitor 206, another suitable power storage component, or any combination thereof. The power source 200 may be electrically coupled to a motor 208 to supply electrical power to the motor 208, which may be configured to operate the condenser fan 158. The supplied electrical power causes the condenser fan 158 to rotate and to direct the air flow into the conduit 166. Rotation of the condenser fan 158 may drive the wind turbine 168 to rotate and cause a shaft of the generator 170 to rotate. In FIG. 6, the shaft is not clearly visible. Rotation of the shaft relative to a magnetic field may generate an electrical current via electromagnetic induction, thereby producing electrical power. In some embodiments, the generator 170 is an induction generator, such as a squirrel cage induction generator or a wound rotor induction generator. In such embodiments, the power source 200 may supply power to the generator 170 to rotate the shaft of the generator 170 and produce a rotating magnetic field. Electrical power is generated when the shaft of the generator 170 is driven to rotate faster than a threshold or synchronous speed. For example, the condenser fan 158 may direct the air flow at a flow rate that drives the wind turbine 168 to rotate and causes the shaft of the generator 170 to rotate at a rotational speed that is faster than the threshold speed. In additional or alternative embodiments, the generator 170 is a synchronous motor, and a magnetic field may be produced without receiving power via the power source 200. Electrical power may then be generated when the shaft of the generator 170 rotates, such as via rotation of the wind turbine 168.

In some embodiments, the electrical power generated by the generator 170 may be delivered to the power source 200, such as to the utility power grid 202. A price corresponding to the amount of electrical power delivered to the utility power grid 202 may then be reimbursed or refunded to the operator of the HVAC system 150. In other words, the total cost of electrical power may be the difference between the price of the electrical power consumed to operate the HVAC system 150 and the price of the electrical power delivered to the power source 200. Thus, delivering electrical power that is generated by the generator 170 to the utility power grid 202 may reduce a cost associated with operating the HVAC system 150. In additional or alternative embodiments, the electrical power generated by the generator 170 may be stored in an electrical energy storage device, such as the battery 204 and/or the capacitor 206. The electrical energy storage device may store the electrical power, and the electrical power may be utilized to operate the HVAC system 150. For instance, another component of the HVAC system 150, such as the motor 208, a controller, a blower, another suitable component, or any combination thereof, may operate by using the electrical power stored in the electrical energy storage device, thereby reducing the amount energy consumed by the HVAC system 150 from external power sources, such as the utility power grid 202.

Figure 7:
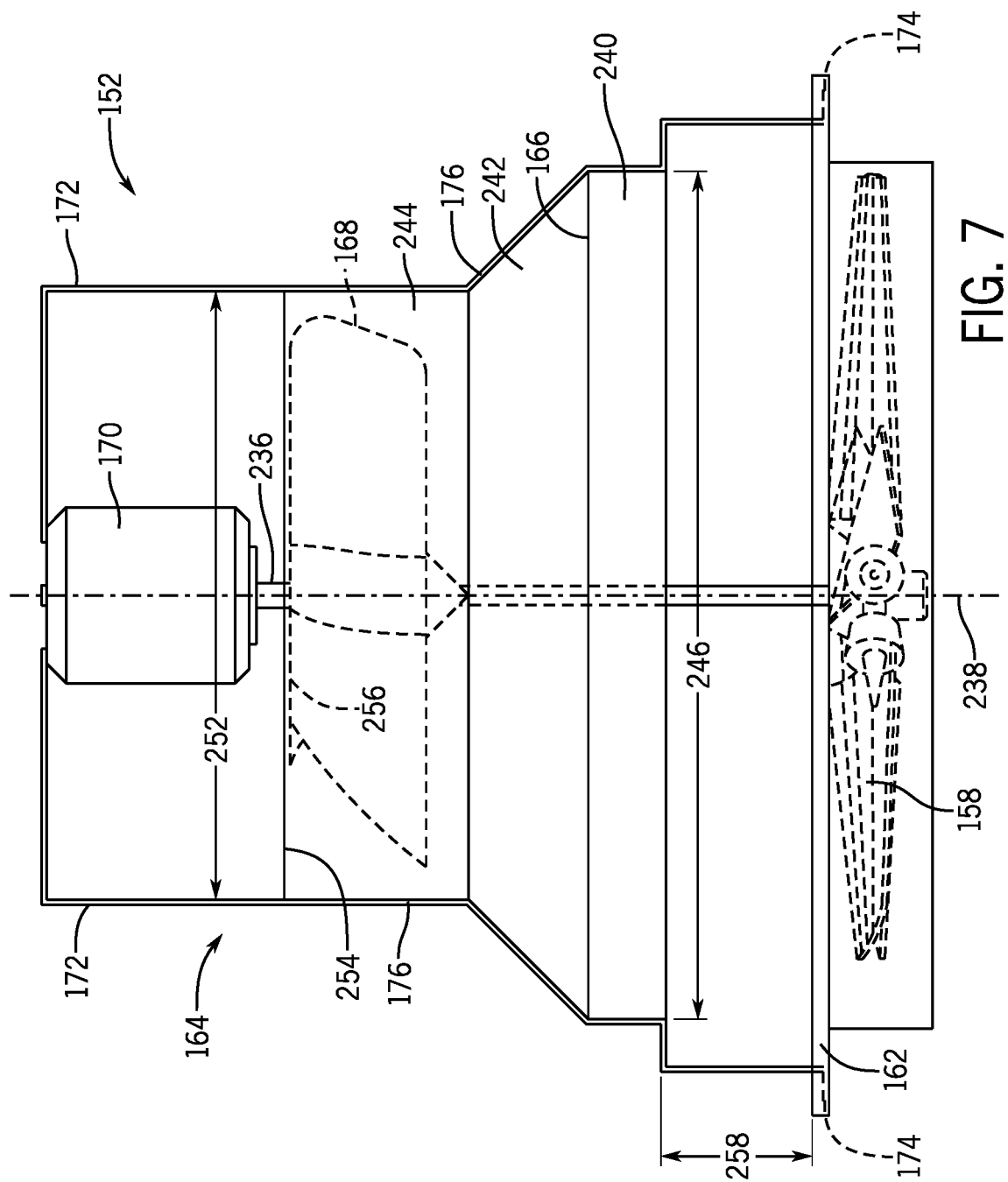
FIG. 7 is a side view of an embodiment of an energy recovery system coupled to a fan deck, in accordance with an aspect of the present disclosure.

FIG. 7 is a side view of an embodiment of the energy recovery system 152 coupled to the fan deck 162. In FIG. 7, the conduit 166 and the fan deck 162 are each transparent to visualize various components more clearly. In certain implementations, the wind turbine 168 may be directly coupled to a shaft 236, such that rotation of the wind turbine 168 may directly drive rotation of the shaft 236. That is, the energy recovery system 152 does not include intermediate components, such as a gear box, that couple the wind turbine 168 to the shaft 236. For this reason, the wind turbine 168 may be axially aligned with the shaft 236 and the generator 170 along a rotational axis 238. In other words, a first rotational axis about which the wind turbine 168 may rotate is aligned with a second rotational axis about which the shaft 236 may rotate. The described assembly limits a hardware footprint of the energy recovery system 152 and reduces mechanical energy losses associated with movement of intermediate components, thereby increasing an efficiency of rotating the wind turbine 168 to generate electrical power.

In the illustrated embodiment, the conduit 166 is a nozzle having an inlet passage 240 configured to receive the air flow directed by the condenser fan 158, a nozzle passage 242 configured to increase the speed or flow rate of the air flow, and a narrowed outlet passage 244 through which the air flow is directed out of the conduit 166. The inlet passage 240, the nozzle passage 242, and the narrowed outlet passage 244 may together define a flow passage of the conduit 166. The wind turbine 168 may be extended via the shaft 238 of the generator 170 into the narrowed outlet passage 244 of the conduit 166. In the illustrated embodiment, the wind turbine 168 is completely contained within the narrowed outlet passage 244. Thus, the wind turbine 168 may receive air that is flowing through the conduit 166 at the greatest velocity.

By way of example, the inlet passage 240 may have a first width or diameter 246 and a corresponding first cross-sectional area. In some embodiments, the first width 246 may be a value between 50 centimeters (20 inches) and 150 centimeters (59 inches), and a geometry of the inlet passage 240 may substantially match a geometry of the opening 165 to enable the condenser fan 158 to force substantially all of the air flow through the conduit 166. The nozzle passage 242 may be tapered to reduce the cross-sectional area of the passage through which the air flow is directed, such that the narrowed outlet passage 244 has a second width or diameter 252 that is less than the first width 246. For example, the second width 252 may be between 15 centimeters (5.9 inches) and 76 centimeters (30 inches). In this manner, the narrowed outlet passage 244 may have a second cross-sectional area that is smaller than the first cross-sectional area. As such, the air may flow through the narrowed outlet passage 244 at a greater velocity than through the inlet passage 240. The increased velocity of the air flow through the narrowed outlet passage 244 may enable the wind turbine 168 to rotate at a greater rotational speed, thereby causing the shaft 236 to rotate at a greater rotational speed and generate more electrical power. In some embodiments, a first edge 254 of the narrowed outlet passage 244 may substantially align with a second edge 256 of the wind turbine 168. As such, air flow that is directed by the wind turbine 168 is immediately forced out of the conduit 166, and an amount of material used to manufacture the conduit 166, such as to manufacture the narrowed outlet passage 244, is limited. In such embodiments, the generator 170 may be positioned external to the conduit 166 to avoid blocking the flow of air through the narrowed outlet passage 244.

As shown in FIG. 7, the support frame 164 suspends the conduit 166 at a position that is offset the fan deck 162 along the rotational axis 238 by an offset distance 258, such as between 0.1 meters and 0.5 meters, to avoid generation of static pressure or resistance that would restrict a rotation of the condenser fan 158. In other words, positioning the conduit 166 away from the fan deck 162 by the offset distance 258 enables the condenser fan 158 to rotate more easily. The support frame 164 may also align the conduit 166 with the condenser fan 158 along the rotational axis 238. In this manner, substantially all of the air flow directed by the condenser fan 158 out of the condenser 152 is forced through the conduit 166 via the inlet passage 240, rather than between the conduit 166 and the fan deck 162 away from the conduit 166. Furthermore, each segment 172 of the support frame 164 generally matches the geometry of the conduit 166 to secure the position of the conduit 166. In other words, the geometry of each segment 172 substantially conforms to the geometry of the conduit 166. The segments 172 cooperatively capture the conduit 166 such that the support frame 164 may securely maintain the position of the conduit 166 relative to the fan deck 162, the opening 165, and the condenser fan 158. In some implementations, each segment 172 may be welded onto the conduit 166. Additionally or alternatively, each segment 172 may be coupled to the conduit 166 via a fastener, an adhesive, a punch, another suitable component, or any combination thereof.

Figure 8:
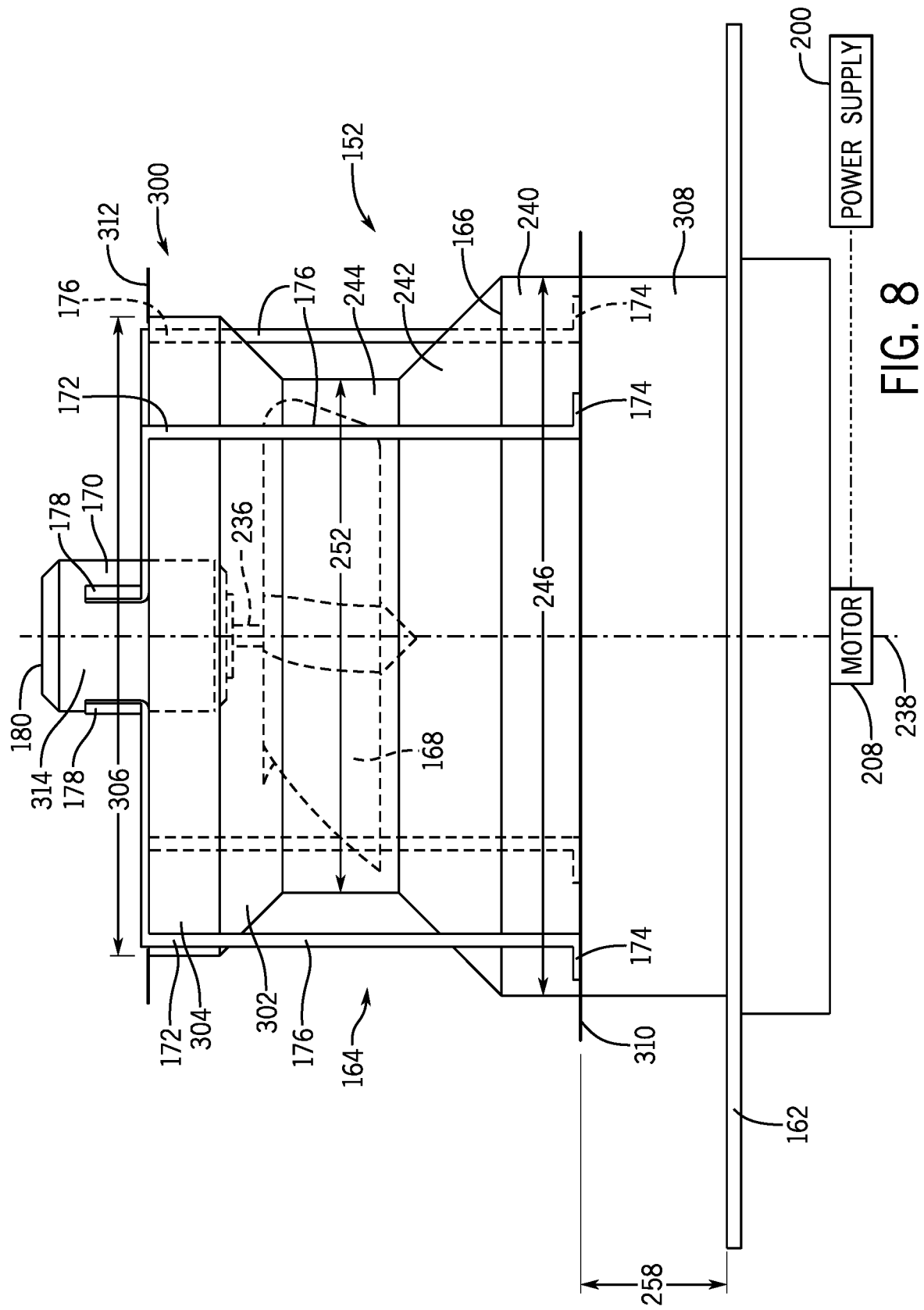
FIG. 8 is a side view of an embodiment of an energy recovery system having a conduit including a nozzle and a diffuser, in accordance with an aspect of the present disclosure.

FIG. 8 is a side view of an embodiment of the energy recovery system 152 having the conduit 166 that includes a diffuser 300 extending from the narrowed outlet passage 244. The diffuser 300 increases the cross-sectional area of the passage through which the air directed by the condenser fan 158 flows. For example, the diffuser 300 may include a diffuser passage 302 extending from the narrowed outlet passage 244 and a diffuser outlet passage 304 extending from the diffuser passage 302. In some implementations, the diffuser passage 302 is coupled to the narrowed outlet passage 244. Alternatively, the narrowed outlet passage 244, the diffuser passage 302, and the diffuser outlet passage 304 may be integrally formed as a single piece. Thus, the narrowed outlet portion 244 directs the air flow into the diffuser 300. The diffuser outlet passage 304 may have a third width or diameter 306 that may be greater than the second width 252 of the narrowed outlet passage 244. As an example, the third width 306 may be between 38 centimeters (15 inches) and 127 centimeters (5 inches). Thus, the diffuser outlet passage 304 has a third cross-sectional area that is larger than the second cross-sectional area of the narrowed outlet passage 244. In certain embodiments, the third width 306 may be substantially the same as the first width 246 of the inlet. Alternatively, the third width 306 may be slightly lesser than the first width 246, or slightly greater than the first width 246.

By increasing the cross-sectional area through which the air flow is directed, the diffuser 300 may create air vortices within the conduit 166 that reduce the static pressure or resistance that would otherwise restrict the condenser fan 158 from rotating. For example, the air vortices may produce a suction pressure that induces air to flow from the fan deck 162 into the conduit 166. As such, when the diffuser 300 is implemented, the condenser fan 158 rotates more easily and may be operated at a lower operating power to direct the air flow at a desirable flow rate through the condenser 154 and into the conduit 166. By way of example, the amount of electrical power supplied to the motor 208 by the power source 200 to rotate the condenser fan 158 may be reduced, thereby reducing a cost associated with operating the HVAC system 150.

In the illustrated embodiment, the conduit 166 also includes or is integrated with a tunnel section 308 that may couple the inlet passage 240 with the fan deck 162. For example, the tunnel section 308 may directly couple to the fan deck 162 and to the inlet passage 240 to secure the conduit 166 to the fan deck 162. In some embodiments, the tunnel section 308 may extend along the rotational axis 238 by the offset distance 258, and may enclose the area between the fan deck 162 and the inlet passage 240. In this manner, substantially all of the air flow directed by the condenser fan 158 is contained within the conduit 166, but the inlet passage 166 is still positioned away from the fan deck 162 by the offset distance 258 to reduce the static pressure that may otherwise restrict rotation of the condenser fan 158. The tunnel section 308 may further include a first flange 310 to which the support frame 164 may couple. That is, the first end 174 of each segment 172 of the support frame 164 couples to the first flange 310. The intermediate section 176 of each segment 172 may then extend along the rotational axis 238, and the second end 178 of each segment may extend over the diffuser outlet passage 304, such as along a second flange 312 of the diffuser outlet passage 304 in a direction traversing the rotational axis 238. In some implementations, each segment 172 may be coupled to the second flange 312 to secure the position of the support frame 164 with the conduit 166. The second end 178 of each segment 172 may couple to the generator 170 and align the generator 170 with the conduit 166 about the rotational axis 238. Each second end 178 may couple to a side 314 of the generator 170, rather than to the surface 180 of the generator 170. In this manner, the segments 172 may collectively capture the generator 170 to secure the position of the generator 170 relative to the conduit 166.

In some embodiments, the support frame 164 may position the generator 170 to be at least partially within the diffuser outlet passage 304, and the shaft 236 of the generator 170 may extend to position the wind turbine 168 within the narrowed outlet passage 244. In additional or alternative embodiments, the support frame 164 may position the generator 170 to be external to the conduit 166, such as above the diffuser outlet passage 304 along the rotational axis 238, to avoid blocking the flow of air through the diffuser outlet passage 304. The shaft 236 of the generator 170 may then be adequately sized to extend the wind turbine 168 to be within the narrowed outlet passage 244. In this way, the generator 170 may be suitably positioned anywhere along the rotational axis 238 relative to the conduit 166, and the shaft 236 may be sized to position the wind turbine 168 within the narrowed outlet passage 244, such that the wind turbine 168 receives the air flowing at the greatest velocity through conduit 166.

Embodiments of the present disclosure are directed to an HVAC system having an energy recovery system that is configured to generate electrical power during operation of the HVAC system. The energy recovery system may be fluidly coupled to a condenser of the HVAC system. The condenser may have a fan that directs an air flow through the energy recovery system, and the air flow may drive a wind turbine of the energy recovery system to rotate. The wind turbine may be coupled to a generator, and rotation of the wind turbine causes the generator to produce electrical power. The produced electrical power may be used to operate a component of the HVAC system, thereby reducing an amount of electrical power used by a separate power source. Additionally or alternatively, the produced electrical power may be returned to a utility power grid to receive a cost compensation, thereby reducing a cost associated with using electrical power. In some embodiments, the energy recovery system includes a conduit through which the air flow may be directed. The conduit may increase the velocity of the air flow and increase a rotational speed of the wind turbine, thereby increasing the amount of electrical power produced by the generator. The conduit may additionally or alternatively create air vortices that enable the fan of the condenser to rotate more easily. That is, a lower power may be used to operate the fan and direct the air flow at a desirable flow rate, thereby reducing an energy consumption associated with operating the fan. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or resequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An energy recovery system for a heating, ventilation, and/or air conditioning (HVAC) system, comprising:
   a nozzle including a flow passage with an inlet passage and an outlet passage that is narrowed relative to the inlet passage, wherein the nozzle is configured to couple to a condenser and receive an air flow into the flow passage from a condenser fan;
   a wind turbine having a first axis of rotation; and
   a generator that is external to the nozzle and that includes a shaft with a second axis of rotation, wherein the shaft extends from the generator to the wind turbine and is coupled to the wind turbine, such that the first axis of rotation is aligned with the second axis of rotation, and wherein the wind turbine is positioned within the outlet passage of the flow passage via the shaft.

2. The energy recovery system of claim 1, comprising a support frame configured to couple to a fan deck of the condenser, wherein the support frame is coupled to the nozzle and the generator and is configured to support the nozzle, the generator, and the wind turbine.

3. The energy recovery system of claim 2, wherein the support frame is configured to suspend the nozzle at an offset distance from the fan deck.

4. The energy recovery system of claim 3, comprising the fan deck, wherein the fan deck includes an opening, and the condenser fan is configured to force the air flow through the opening and into the flow passage.

5. The energy recovery system of claim 1, wherein the wind turbine completely axially overlaps with the outlet passage.

6. The energy recovery system of claim 1, wherein the outlet passage of the flow passage is configured to direct the air flow out of the nozzle and into a diffuser extending from the outlet passage of the flow passage.

7. The energy recovery system of claim 6, wherein the nozzle and the diffuser are integrated with one another.

8. The energy recovery system of claim 1, wherein the generator is electrically coupled to a utility power grid, a battery, or both.

9. The energy recovery system of claim 1, wherein the generator is an induction generator.

10. The energy recovery system of claim 1, wherein the wind turbine is directly coupled to the shaft.

11. An energy recovery system for a heating, ventilation, and/or air conditioning (HVAC) system, comprising:
a conduit configured to receive an air flow, wherein the conduit has a narrowed outlet passage;
a generator;
a wind turbine having a rotational axis and coupled to the generator, wherein rotation of the wind turbine about the rotational axis causes the generator to produce electrical power; and
a support frame coupled to the generator and to the conduit, such that the conduit, the generator, and the wind turbine are aligned about the rotational axis of the wind turbine, wherein the generator is positioned external to the narrowed outlet passage of the conduit via the support frame, and the wind turbine is disposed within the narrowed outlet passage.

12. The energy recovery system of claim 11, wherein the support frame includes a segment, a first end of the segment is coupled to a fan deck of the HVAC system, a second end of the segment is coupled to the generator, and an intermediate section of the segment is coupled to the conduit.

13. The energy recovery system of claim 12, wherein the intermediate section conforms to a geometry of the conduit.

14. The energy recovery system of claim 11, wherein the support frame is configured to align the conduit, the generator, and the wind turbine with one another along the rotational axis of the wind turbine.

15. The energy recovery system of claim 11, wherein the conduit has an inlet passage that transitions from a first width to a narrower second width.

16. The energy recovery system of claim 15, wherein the conduit includes a diffuser extending from the narrowed outlet passage, wherein the diffuser has a diffuser outlet passage having a third width that is greater than the second width.

17. The energy recovery system of claim 11, wherein a first edge of the wind turbine substantially aligns with a second edge of the narrowed outlet passage.

18. A heating, ventilation, and/or air conditioning (HVAC) system, comprising:
a condenser having a fan deck and a condenser fan, wherein the fan deck has an opening, and the condenser fan is configured to direct an air flow through the opening; and
an energy recovery system having a conduit positioned from the fan deck by an offset distance and configured to receive the air flow directed through the opening, a support frame coupled to a generator and to the conduit, and a wind turbine having a rotational axis and coupled to the generator, wherein the conduit, the generator, and the wind turbine are aligned about the rotational axis of the wind turbine, wherein the conduit comprises an inlet passage having a first width, a narrowed passage having a second width that is less than the first width, and a diffuser outlet passage having a third width that is greater than the second width, and wherein the wind turbine is disposed within the narrowed passage.

19. The HVAC system of claim 18, wherein the generator is disposed at least partially within the diffuser passage, the energy recovery system comprises a shaft extending from the generator to the wind turbine along the rotational axis, such that the wind turbine is suspended within the narrowed passage via the shaft.

20. The HVAC system of claim 18, comprising a tunnel section coupled to the inlet passage of the conduit and to the fan deck to position the conduit at the offset distance from the fan deck, wherein the tunnel section has a flange, and the support frame has a segment coupled to the flange at an end of the segment.

21. The HVAC system of claim 20, wherein the flange is a first flange, the end is a first end, the diffuser outlet passage has a second flange, and an intermediate section of the segment extends along the rotational axis to the second flange and a second end of the segment extends along the second flange in a direction transverse to the rotational axis.

22. The HVAC system of claim 21, wherein a side of the generator is coupled to the second end of the segment.

23. The HVAC system of claim 18, wherein the narrowed passage, the diffuser passage, and the diffuser outlet passage are integrally formed as one piece.

24. The HVAC system of claim 18, comprising a motor configured to rotate the condenser fan, wherein the generator and the motor are each electrically coupled to a power source, the generator is configured to deliver generated electrical power to the power source to store the generated electrical power, and the power source is configured to supply the generated electrical power to the motor to rotate the condenser fan.

25. The HVAC system of claim 18, wherein the opening has a first cross-sectional area, and the inlet passage has a second cross-sectional area that is approximately equal to the first cross-sectional area.

* * * * *